Feb. 17, 1931.   C. S. DEWEY   1,792,680
VEHICLE DUMPING BODY
Filed Feb. 11, 1930   2 Sheets-Sheet 1
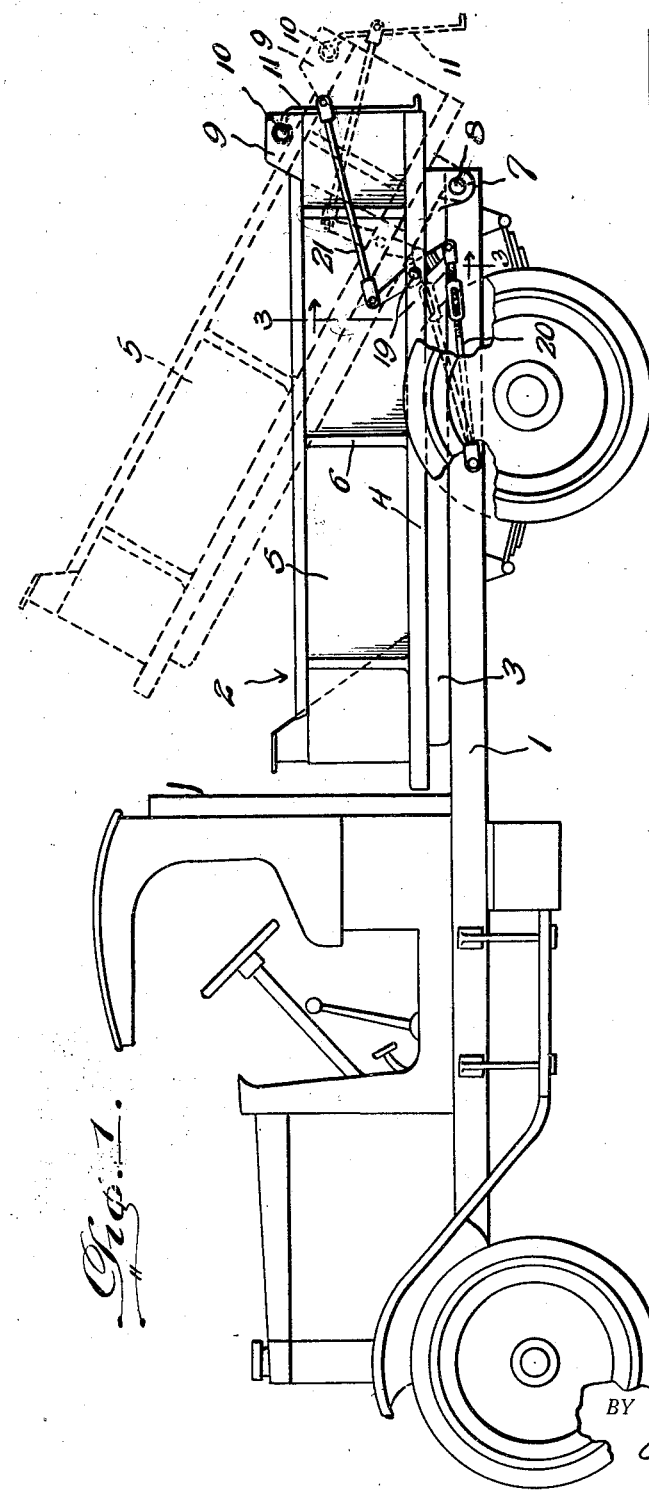
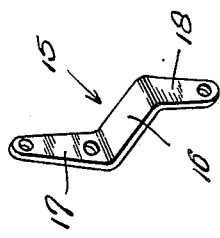
Charles S. Dewey,
INVENTOR.
BY J. Stanley Burch
ATTORNEY.

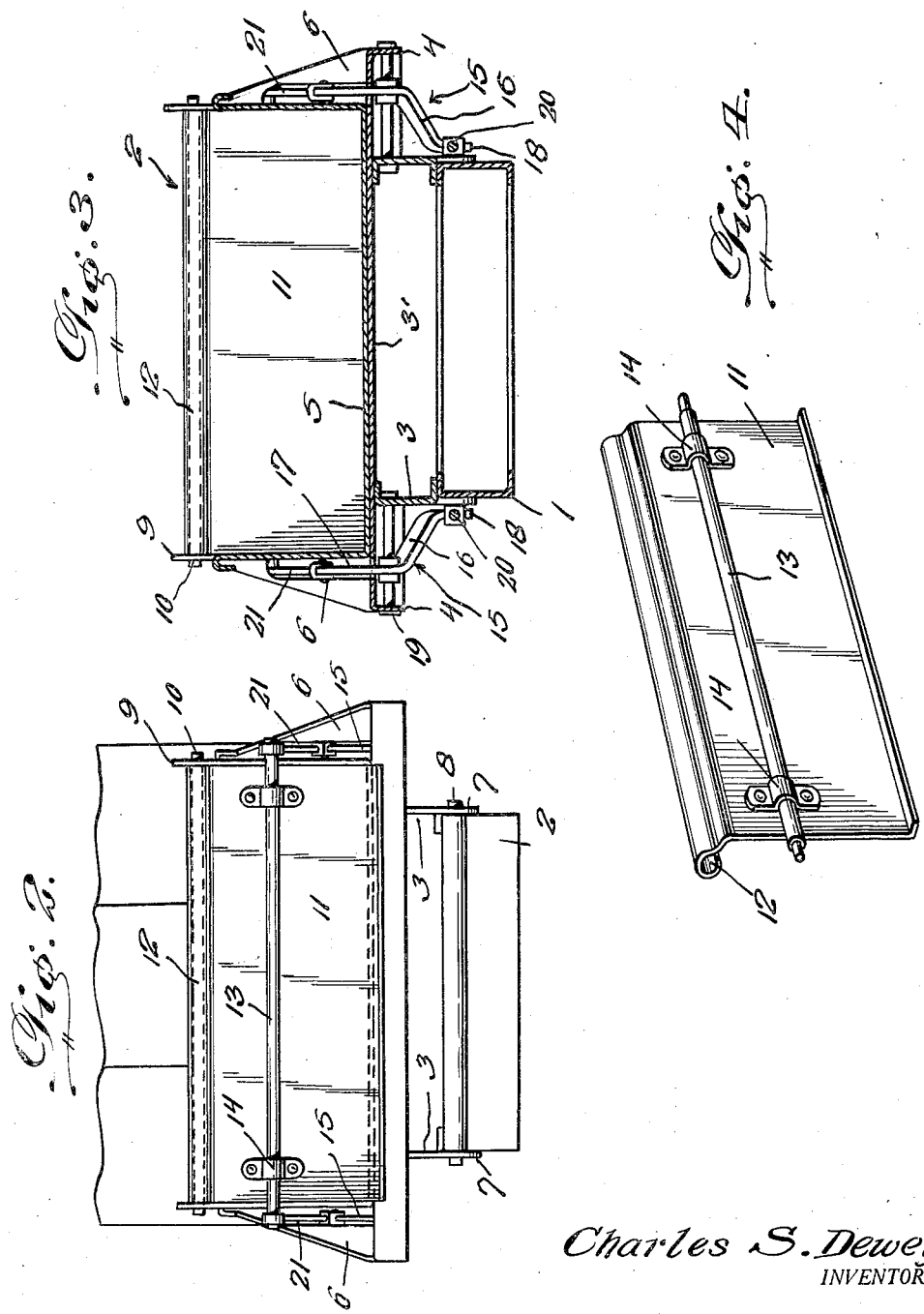

Patented Feb. 17, 1931

1,792,680

UNITED STATES PATENT OFFICE

CHARLES S. DEWEY, OF ELMIRA, NEW YORK

VEHICLE DUMPING BODY

Application filed February 11, 1930. Serial No. 427,572.

The present invention relates to improvements in vehicle dumping bodies and has reference more particularly to that type of dumping bodies wherein the same is tilted to discharge the material therefrom.

More particularly, the present invention resides in the provision of means for automatically actuating the pivoted tail gate simultaneously with the tilting of the body.

A further and important object of the present invention is to provide a structure of the above-mentioned character wherein the tail gate will be actuated to open simultaneously with the shifting of the body to an inclined dumping position, the gate being moved to a closed position upon the return of the body to its normal horizontal position on the chassis of the truck.

Still a further object is to provide a structure of the above-mentioned character wherein the tail gate may be adjusted to any predetermined open position depending upon the angle at which the dumping body is tilted so that the material discharge will be regulated in its flow from the body.

Another object is to provide a vehicle dumping body which is simple in construction, inexpensive, strong and durable and further well adapted to the purposes for which it is designed.

Other objects and advantages of the present invention will become apparent when taken in connection with the accompanying drawings.

In the accompanying drawings wherein like reference characters indicate corresponding parts throughout the several views:

Figure 1 is a side elevation of a vehicle dumping body embodying my invention.

Figure 2 is a rear end elevation thereof.

Figure 3 is a vertical sectional view taken approximately on the line 3—3 of Figure 1 looking in the direction of the arrows.

Figure 4 is a detail perspective view of the tail gate; and

Figure 5 is a detail perspective view of one of the rock levers forming a salient part of the present invention.

In the drawings wherein for the purpose of illustration is shown the preferred embodiment of my invention, the numeral 1 designates the chassis of a motor vehicle truck and mounted for vertical swinging movement on the chassis is the dumping body denoted generally by the numeral 2. The body includes a pair of channel-shaped side sills 3 for rest upon the respective sides of the chassis 1 and extending across the top of these sills is the relatively wide plate 3', this plate being welded or otherwise fixedly secured to the sills 3. The side edges of the plate 3' extend beyond the chassis 1 and terminate in the depending flanges 4 as clearly shown in Figure 3 for a purpose to be presently described.

Secured on the plate 3' is the box 5 that is preferably constructed of metal, the rear end of the box being open. The box is of a width less than that of the plate 3' and tapered reinforcing webs 6 connect the sides of the box 5 with the projecting portions of the plate 3'.

The rear ends of the sills 3 are formed with depending ears 7 for disposition adjacent the outer faces of the vertical sides of the rear end portions of the chassis 1 and a rod 8 extends through the sides of the chassis and through said depending ears 7 whereby said body 2 is pivotally connected at its rear end to the rear end portion of the chassis and is adapted to be tilted or raised at its forward end by any appropriate hoisting means not shown.

The sides of the box 5 are formed with upstanding ears 9 at the rear end of the box to accommodate the transversely disposed rod 10 and on which rod is pivotally suspended, the tail gate 11. This tail gate has its upper edge portion offset and rolled to form an elongated tube 12 to accommodate the rod 10 and the tail gate is adapted to fit snugly against the rear edges of the sides of the box 5 when the box is in a horizontal position.

Carried by the outer face of the tail gate 11 is a longitudinally extending rod 13, the same being supported by suitable brackets 14. The ends of the rod 13 project beyond the side edges of the tail gate and are reduced as suggested more clearly in Figure 4 of the drawings.

The actuating means for the tail gate 11 includes the provision of a pair of rock levers 15, such as is shown in Figure 5 for disposition on opposite sides of the body 2. Each rock lever includes an angularly disposed central portion 16, with the end portions being disposed substantially vertically. The upper end portion 17 is pivotally connected to the lower edge portion of the box 5 on each side thereof and forwardly of the rear end of the box as at 19. The upper end portion 17 extends through a suitable slot provided therefor in the outer edge portion of the plate 3' as shown very clearly in Figure 3, while the lower end portion 18 extends downwardly adjacent the outer face of the respective sill 3. The pivotal support for each rock lever includes a pin 19 that extends through each sill 3 and the adjacent depending flange 4 as illustrated very clearly in Figure 3.

An adjustable rod 20 provides an operative connection between the lower end 18 of each rock lever and the chassis 1, the forward end of each rod being connected to the respective side of the chassis at a point forwardly of the connection of the rock lever with the body 2.

The upper end of each rock lever is in turn operatively connected to the respective end of the rod 13 by means of a connecting link 21 and this is clearly shown in Figure 1 of the drawings.

Normally when the body 2 is in the position shown in Figure 1 in the full lines, the gate 11 will be held in a closed position. Simultaneously with the upward swinging movement of the body 2 on the pivot 8, the link and lever mechanism will be actuated whereby to cause the tail gate 11 to automatically open to permit the dumping of the contents from the box 5. The angle at which the tail gate 11 is swung to an open position depends upon the angle at which the body is tilted.

Manifestly when the body is returned to its lowered horizontal position, the links and levers will cooperate simultaneously with the lowering of the body to move the tail gate 11 to a closed position against the open rear end of the box 5.

It will thus be seen from the foregoing description, that I have provided a vehicle dumping body wherein the tail gate associated therewith will be automatically moved to an open or closed position simultaneously with the raising and lowering respectively of the body. The simplicity of my construction will permit the dumping body to be built at a very low cost and will at all times be positive and efficient in carrying out the purposes for which it is designed.

While I have shown the preferred embodiment of the invention, it is to be understood that minor changes in the size, shape and arrangement of parts may be resorted to without departing from the spirit of the invention and the scope of the appended claims.

What I claim as new is:

1. In combination with a supporting chassis, a dumping body structure arranged for vertical swinging movement on the chassis, said dumping body structure including a pair of longitudinally extending side sills for rest on the chassis, the rear ends of the sills being pivotally connected to the adjacent portions of the chassis, a relatively wide plate extending across said sills and connected thereto, the side edges of the plate extending beyond the supporting chassis, a box carried by the plate and open at its rear end, a vertically swinging tail gate pivoted at its upper edge to the upper rear end of the box, a pair of rock levers pivoted intermediate their ends on the respective sills, the upper ends of the rock levers extending through the projecting portions of the plate, rods operatively connected at their rear ends to the lower ends of the levers, and at their forward ends to the respective sides of the supporting chassis, and means for operatively connecting the upper ends of the rock levers with the tail gate whereby the tail gate will be automatically actuated when the dumping body is raised or lowered.

2. In combination with a supporting chassis, a dumping body structure arranged for vertical swinging movement on the chassis, said dumping body structure including a pair of longitudinally extending side sills for rest on the chassis, the rear ends of the sills being pivotally connected to the adjacent portions of the chassis, a relatively wide plate extending across said sills and connected thereto, the side edges of the plate extending beyond the supporting chassis, a box carried by the plate and open at its rear end, a vertically swinging tail gate pivoted at its upper edge to the upper rear end of the box, a pair of rock levers pivoted intermediate their ends on the respective sills, the upper ends of the rock levers extending through the projecting portions of the plate, rods operatively connected at their rear ends to the lower ends of the levers, and at their forward ends to the respective sides of the supporting chassis, a rod carried by the tail gate and having its ends extending beyond the respective side edges of the tail gate, and links operatively connecting the upper ends of the rock levers with the respective ends of the rod for effecting the simultaneous actuation of the tail gate with the actuation of the dumping body when the latter is raised and lowered.

In testimony whereof I affix my signature.

CHARLES S. DEWEY.